C. B. SCHOENMEHL.
GALVANIC BATTERY.
APPLICATION FILED APR. 23, 1912.
1,080,484.
Patented Dec. 2, 1913.
2 SHEETS—SHEET 2.
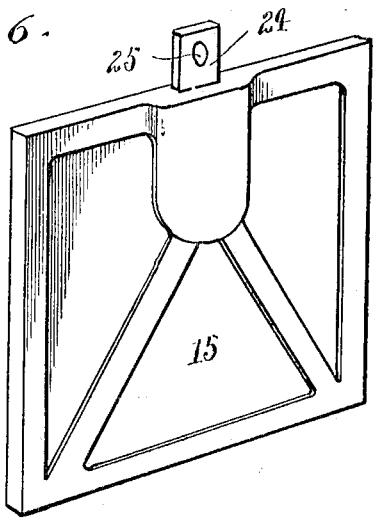
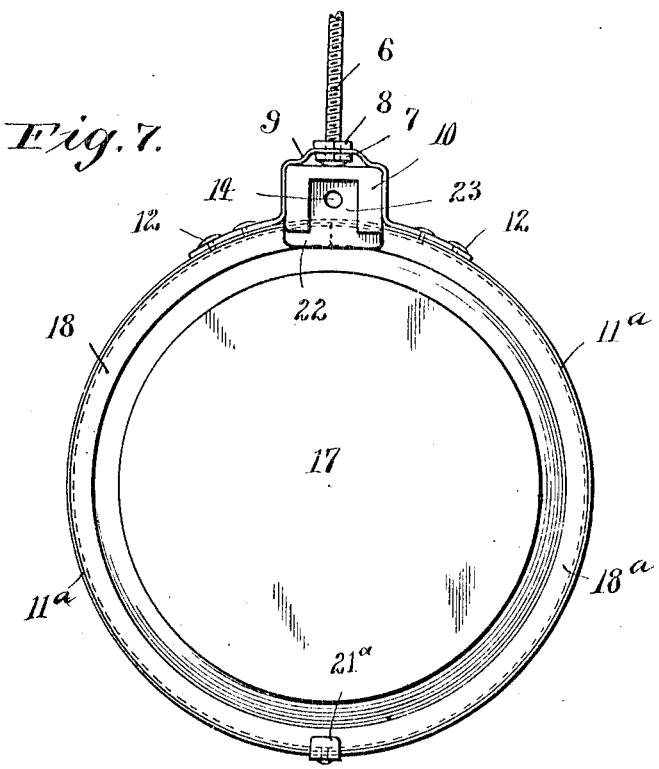
Witnesses
Ivan L. Morehouse
Mildred Macleod
Inventor
Charles B. Schoenmehl
By
Chamberlain & Newman
Attorneys

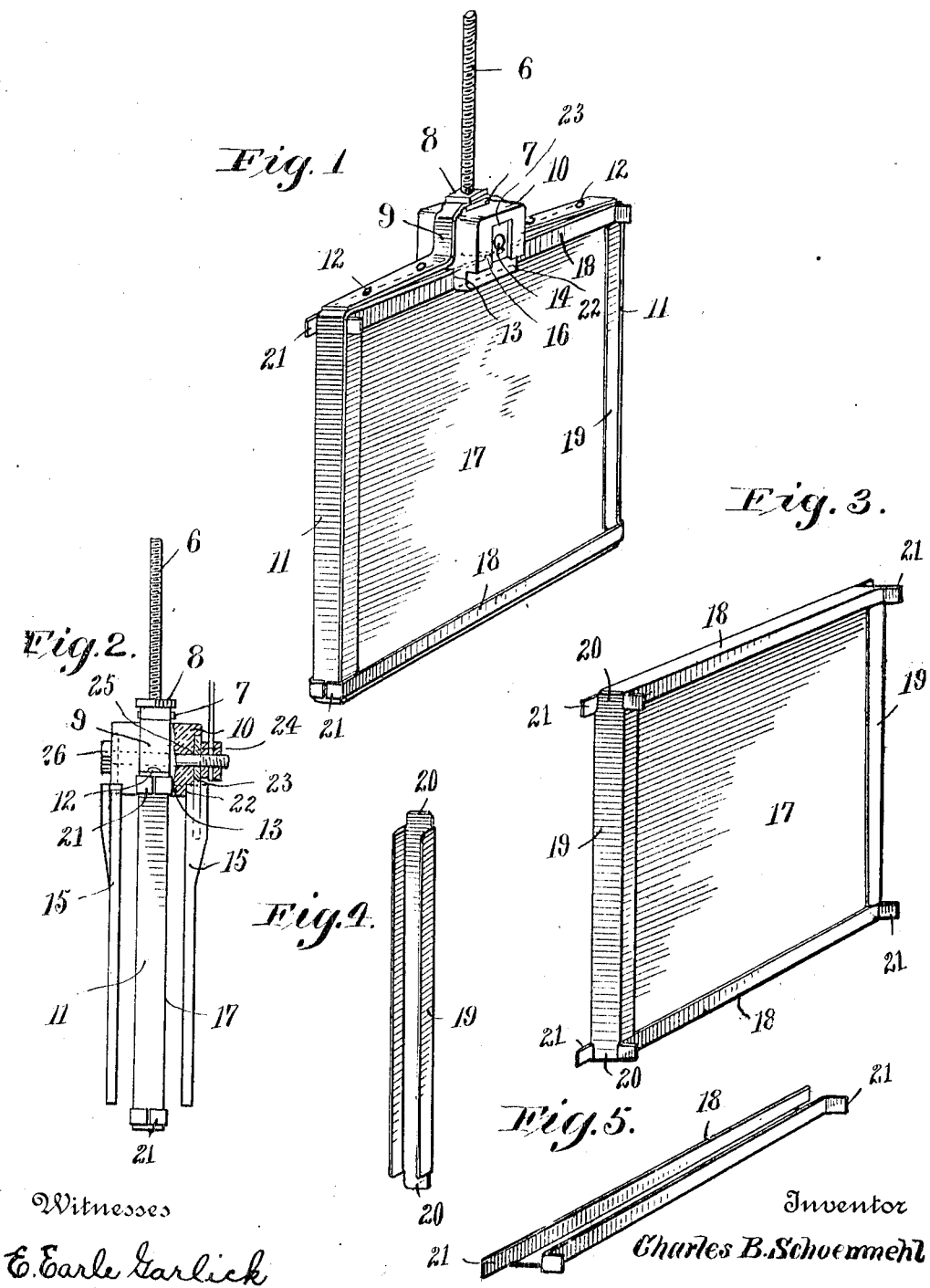

UNITED STATES PATENT OFFICE.

CHARLES B. SCHOENMEHL, OF WATERBURY, CONNECTICUT.

GALVANIC BATTERY.

1,080,484.  Specification of Letters Patent.  Patented Dec. 2, 1913.

Application filed April 23, 1912. Serial No. 692,735.

*To all whom it may concern:*

Be it known that I, CHARLES B. SCHOENMEHL, citizen of the United States, and resident of Waterbury, in the county of New Haven and State of Connecticut, have invented certain new and useful Improvements in Galvanic Batteries, of which the following is a specification.

My invention relates to improvements in galvanic batteries, and particularly to that type of battery employing plate forms of copper oxid and zinc electrodes. The invention particularly refers to improvements in supporting means for both said electrodes, whereby the said copper oxid plate as well as the co-acting zinc or positive electrodes may be properly supported on the frame and from the cover of a jar, by a single supporting rod.

The purposes of the invention are first to provide a combined frame and hanger for compressed oxid of copper negative plate electrodes whereby an improved contact of the frame with the plate is insured and whereby irregularities of shape due to shrinkage or warping may be compensated for, thus enabling all negative plates of a supposedly fixed size being readily inserted into the frame without the necessity of grinding or fitting the plates; to so construct the device that the hanger proper can be employed or used over and over again, and will permit of the insertion of new plates; to provide a frame which will protect and strengthen the plates, rendering them less liable to break in shipment and handling; and second to provide a new form of insulating block upon the frame and to which an improved construction of positive plate is rigidly attached.

Other objects of the invention will hereinafter appear and to these ends the invention consists in a battery frame for carrying out the above objects; embodying the features of construction; combination of elements and arrangement of parts having the general mode of operation substantially as hereinafter fully described and claimed in the specification and claims and shown in the accompanying drawings in which, Figure 1, shows a perspective view of my improved form of battery electrode hanger and plate frame with the negative or compressed copper oxid plate contained therein. Fig. 2 is a side edge view partially in section of the frame with the positive or zinc plate electrode attached to the sides thereof. Fig. 3 is a perspective view of the said negative compressed copper oxid plate electrode with edge or frame strips attached and ready for insertion into the hanger. Fig. 4 is a perspective view of one of the side channel strips of plate frame, detached, Fig. 5, is a further perspective view of the top and bottom channel strips of plate frame as employed on the negative electrode shown in Fig. 3. Fig. 6, shows a detached perspective view of one of the zinc or positive plates shown in Fig. 2, and, Fig. 7, shows a modified form of hanger and plate frame, for a round compressed oxid plate.

Upon the drawings 6 represents a suspending rod by means of which the hanger, frame and attached electrode, constituting the assembled element, are suspended from the cover or bridge of a battery jar, not shown. The lower end of this suspending rod is provided with a head 7 and a nut 8 whereby the said rod is made fast to a strip 9 passing over an insulating block 10. This block is supported upon the rectangular hanger 11 the top portion of which is secured to the before mentioned strip 9 by means of suitable rivets 12 at either side of the porcelain block 10. This hanger 11 is thus formed of a plain flat piece of sheet metal, bent into a rectangular form and having its two end portions brought together central of the top as shown at 16 in dotted lines in Fig. 1, and there covered by the before mentioned porcelain block 10 which straddles the said strip. The width of the strip of which the hanger is formed is substantially the same as that of the thickness of the negative plate 17 and is formed with smooth side edges which permit the plate to be inserted from either side. The under central portion of the porcelain block is provided with a longitudinal recess 13 to receive the hanger frame and plate and to hold the block in position intermediate of the said top cross member of the hanger, and the before mentioned strip 9. The opposite under outer edge portions of the block are cut away as shown in Figs. 1 and 2 to form a shoulder 22 against which the top central edge portion of the zinc plates are secured. In each outer side of the block is also formed elongated a vertical recess 23 to receive the brass supporting stem 24 cast in the upper central portion of the zinc plates. A hole 25 is formed through these stems as shown, to register with the hole 14 through the block. A bolt 26 is passed through the stems of the plates and the hole in the block, and is provided with nuts for securing the parts firmly together in the manner shown in Fig. 2.

The foregoing construction obviously insures a rigid attachment of the positive plates to the porcelain and a true alinement of the said positive with the negative plates, and also durable connection between the said zinc plates and bolt, that will not be affected and destroyed in use.

The negative plate electrode which is designated as 17 may be formed with plain flat sides or be provided with beveled edges as preferred, and further be of such other size and proportion as may be deemed advisable. I employ suitable sheet metal channel strips 18 and 19 to cover the several edges of the negative electrode plate in the manner shown in Fig. 3, and thus produce an inexpensive form of frame which in practice closely hugs the edge portion of the plate in a manner to form a good and sufficient electrical contact between the plate and its frame as well as the hanger 11 in which the plate and frame are removably supported. This frame as shown in the preferred forms is formed of four channel strips, the top and bottom ones of which are alike in construction and designated as 18. The side members 19—19 are also alike and have their side flanges cut away slightly adjacent to their end portions leaving the central or body portion extended slightly to form the central extensions 20 as shown in Figs. 3 and 5. The intermediate portions of the ends of the top 18 are cut away to form the side flange extensions 21 which are easily bent over upon the sides of the hanger. These plate frame members are laid together upon the respective edges of the electrode 17 in the manner shown in Fig. 3, with the end flange extensions 21 bent out to one side at substantially a right angle. This leaves the plate and frame in form to be placed in the hanger which operation is obviously simple, since the size of the plate with removable strips, constituting its frame, are just right to fit snugly into the four walls of the hanger, the top edge of the plate being first inserted to engage the recess in the under side of the block whereupon the remaining portion of the plate is likewise slipped into position. This leaves the extensions 21 upon the one side disposed straight outward in their original form and the opposite extensions at a right angle as shown at the upper corners in Fig. 1. Both of these extensions are thereupon bent over upon the outside of the hanger in the manner shown at the lower corners in Fig. 1, thereby firmly securing the plate and its frame together in position within the hanger. If it be desired at any time to remove the plate it can be readily done by first bending back the four extensions on one side and then shoving the plate out from the hanger so that a renewal may be inserted if desired.

In Fig. 7, I have shown a hanger adapted to support a round annular plate when mounted in a frame hung in a plain flat circular form of hanger 11$^a$ that is made of one piece of sheet metal. An insulating block 10 similar to that shown in Figs. 1 and 2 is mounted upon the hanger and frame and secured by means of the before mentioned attached strip 9 which is provided with a suspending rod 6. The plate frame 18$^a$ in this form is made of a single length of sheet metal channel strip which is curled around to engage the edges of the plate. The plate and frame are supported within the hanger at the top by means of the before mentioned insulating block and at the bottom by a small piece of sheet metal 21$^a$ secured to the hanger and having extensions that are bent up against the sides of the plate frame.

Having thus described my invention what I claim and desire to secure by Letters Patent is:—

1. In an electrode support for batteries, the combination of a sheet metal hanger, an insulating block mounted upon the hanger, a strip passing over the block and having its ends secured to the hanger, a plate electrode, a metal frame engaging the edges of the electrode and adapted to be supported within the hanger, and means for securing the plate and frame in said hanger.

2. In an electrode support for batteries, the combination of a sheet metal hanger, a block seated upon the hanger and having a recess therein, a plate electrode seated in the recess of the block, a channel frame engaging the several edges of the electrode and adapted to fit into the hanger, and means to engage the lower portions of the hanger and frame.

3. In an electrode support for batteries, the combination of a sheet metal hanger, a plate electrode, a frame for the electrode adapted to be retained within the hanger and comprising four separable sheet metal channel strips to engage the edges of the electrode, and having their end portions cut out to fit together and to form extensions to detachably secure the frame in said hanger.

4. In an electrode support for batteries, the combination of a sheet metal hanger having its two ends brought together at the top, a recessed insulating block seated on said end portions to support a positive electrode, a strip securing the said end portions of the hanger together, a plate electrode, separable sheet metal channel strips to engage the four edges of the electrode, said electrode and frame being adapted to be detachably retained in the said hanger.

5. An electrode support for batteries, comprising a loop like hanger, a plate electrode, a frame fitted around the edge portions of the electrode and adapted to be removably set into the hanger from either side and having integral extended parts to engage the hanger whereby the same may serve to detachably connect the frame and hanger.

6. An electrode support for batteries, comprising a loop like hanger, a plate electrode, a frame fitted around the edge portions of the electrode and formed of separate sheet metal channel members having suitable extensions for engaging the hanger for the detachable connection of the plate in the hanger, an insulating block mounted upon the hanger and positive electrodes supported from the said block.

Signed at Bridgeport in the county of Fairfield and State of Connecticut this 22nd day of April A. D. 1912.

CHARLES B. SCHOENMEHL.

Witnesses:
C. M. NEWMAN,
RUTH M. WORDEN.